US012781639B2

(12) United States Patent
Callaway et al.

(10) Patent No.: US 12,781,639 B2
(45) Date of Patent: Nov. 3, 2026

(54) CERAMIC MATRIX COMPOSITE ARTICLE AND METHOD OF MAKING THE SAME

(71) Applicant: Raytheon Technologies Corporation, Farmington, CT (US)

(72) Inventors: Evan B. Callaway, Santa Barbara, CA (US); Cristal Chan, East Hampton, CT (US); Daniel L. Becerra, West Hartford, CT (US)

(73) Assignee: RTX CORPORATION, Farmington, CT (US)

( * ) Notice: Subject to any disclaimer, the term of this patent is extended or adjusted under 35 U.S.C. 154(b) by 744 days.

(21) Appl. No.: 17/882,164

(22) Filed: Aug. 5, 2022

(65) Prior Publication Data

US 2024/0044260 A1 Feb. 8, 2024

(51) Int. Cl.

| | |
|---|---|
| ***F01D 25/00*** | (2006.01) |
| ***C04B 35/80*** | (2006.01) |
| ***C04B 41/50*** | (2006.01) |
| ***C04B 41/87*** | (2006.01) |

(52) U.S. Cl.

CPC ............ *F01D 25/005* (2013.01); *C04B 35/80* (2013.01); *C04B 41/5035* (2013.01); *C04B 41/5064* (2013.01); *C04B 41/87* (2013.01); *C04B 2235/3418* (2013.01); *C04B 2235/386* (2013.01); *C04B 2235/5216* (2013.01); *F05D 2230/31* (2013.01); *F05D 2300/222* (2013.01); *F05D 2300/2282* (2013.01); *F05D 2300/6033* (2013.01); *F05D 2300/611* (2013.01)

(58) Field of Classification Search

None

See application file for complete search history.

(56) References Cited

U.S. PATENT DOCUMENTS

| | | | | |
|---|---|---|---|---|
| 5,110,771 | A | 5/1992 | Carptenter et al. | |
| 5,162,271 | A | 11/1992 | Carptenter et al. | |
| 5,202,059 | A * | 4/1993 | Kennedy | C04B 35/62863 252/389.41 |
| 5,221,578 | A | 6/1993 | Carpenter et al. | |
| 5,275,984 | A | 1/1994 | Carpenter et al. | |
| 6,528,190 | B1 * | 3/2003 | Campbell | C04B 35/80 428/332 |

(Continued)

FOREIGN PATENT DOCUMENTS

| | | |
|---|---|---|
| CA | 2239887 | 11/2005 |
| CA | 2952471 | 12/2015 |

(Continued)

OTHER PUBLICATIONS

European Search Report for European Patent Application No. 23188475.0 dated Jan. 8, 2024.

*Primary Examiner* — Seth Dumbris

(74) *Attorney, Agent, or Firm* — Carlson, Gaskey & Olds, P.C.

(57) ABSTRACT

A method of making a ceramic matrix composite component includes arranging a plurality of ceramic-based reinforcements in an array, applying an interface coating to the ceramic-based reinforcements, applying a layer of ceramic-based matrix over the interface coating, and applying a secondary interface coating such that the secondary interface coating is separate and distinct from the layer of ceramic-based matrix. A ceramic matrix composite component is also disclosed.

8 Claims, 4 Drawing Sheets

(56) References Cited

U.S. PATENT DOCUMENTS

| | | | |
|---|---|---|---|
| 9,322,889 | B2 | 4/2016 | Nordman et al. |
| 10,011,902 | B1 | 7/2018 | Philippe et al. |
| 2006/0141257 | A1* | 6/2006 | Subramanian ........ C04B 35/565 264/642 |
| 2007/0117484 | A1* | 5/2007 | Kmetz .............. C04B 35/62868 442/127 |
| 2012/0082832 | A1* | 4/2012 | Flandermeyer ........ D06M 11/58 428/428 |
| 2014/0030076 | A1 | 1/2014 | Nunez et al. |
| 2014/0273681 | A1 | 9/2014 | Chamberlain et al. |
| 2014/0363574 | A1 | 12/2014 | Lazur et al. |
| 2015/0310971 | A1* | 10/2015 | Kmetz .................... C23C 16/16 427/128 |
| 2017/0240474 | A1* | 8/2017 | Lazur ................ C04B 35/62884 |

FOREIGN PATENT DOCUMENTS

| | | | |
|---|---|---|---|
| CN | 104788130 A | * | 7/2015 |
| FR | 3059322 | | 6/2018 |

* cited by examiner

CERAMIC MATRIX COMPOSITE ARTICLE AND METHOD OF MAKING THE SAME

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

This disclosure relates to composite articles, such as those used in gas turbine engines, and methods of coating such articles. Components, such as gas turbine engine components, may be subjected to high temperatures, corrosive and oxidative conditions, and elevated stress levels. Ceramic materials such as ceramic matrix composites may be suitable for use in such conditions.

SUMMARY

A method of making a ceramic matrix composite component according to an exemplary embodiment of this disclosure, among other possible things includes arranging a plurality of ceramic-based reinforcements in an array, applying an interface coating to the ceramic-based reinforcements, applying a layer of ceramic-based matrix over the interface coating, and applying a secondary interface coating such that the secondary interface coating is separate and distinct from the layer of ceramic-based matrix.

In a further example of the foregoing, the layer of ceramic-based matrix is a first layer of ceramic-based matrix. The method also includes applying a second layer of ceramic-based matrix over the secondary interface coating.

In a further example of any of the foregoing, a thickness of the first layer of ceramic-based matrix is between about 5 and about 25 microns after the applying.

In a further example of any of the foregoing, a thickness of the second layer of ceramic-based matrix is between about 25 and about 50 microns thick after the applying.

In a further example of any of the foregoing, a sum total thickness of the first and second layers of ceramic-based matrix is between about 25 and about 150 microns after the applying.

In a further example of any of the foregoing, the applying steps are accomplished by chemical vapor infiltration (CVI).

In a further example of any of the foregoing, the plurality of ceramic-based reinforcements are fibers.

In a further example of any of the foregoing, a thickness of the interface coating is between 50 and 250 nanometers after the applying.

In a further example of any of the foregoing, a thickness of the secondary interface coating is between 50 and 250 nanometers after the applying.

In a further example of any of the foregoing, at least one of the interface coating and the secondary interface coating are boron nitride.

In a further example of any of the foregoing, the secondary interface coating is a silica-based oxide.

A ceramic matrix composite component according to an exemplary embodiment of this disclosure, among other possible things includes a plurality of ceramic-based reinforcements, an interface coating disposed on the ceramic-based reinforcements, a first layer of ceramic-based matrix disposed on the interface coating, a secondary interface coating disposed on the first layer of ceramic-based matrix, and a second layer of ceramic-based matrix disposed on the secondary interface coating. The secondary interface coating is separate and distinct from the first and second layers of ceramic-based matrix.

In a further example of the foregoing, a thickness of the interface coating is between 50 and 250 nanometers.

In a further example of any of the foregoing, a thickness of the secondary interface coating is between 50 and 250 nanometers.

In a further example of any of the foregoing, at least one of the interface coating and the secondary interface coating are boron nitride.

In a further example of any of the foregoing, the secondary interface coating is a silica-based oxide.

In a further example of any of the foregoing, a thickness of the first layer of ceramic-based matrix is between about 5 and about 25 microns.

In a further example of any of the foregoing, a thickness of the second layer of ceramic-based matrix is between about 25 and about 50 microns thick.

In a further example of any of the foregoing, a sum total thickness of the first and second layers of ceramic-based matrix is between about 25 and about 150 microns.

In a further example of any of the foregoing, the plurality of ceramic-based reinforcements are fibers.

DETAILED DESCRIPTION

Figure 1:
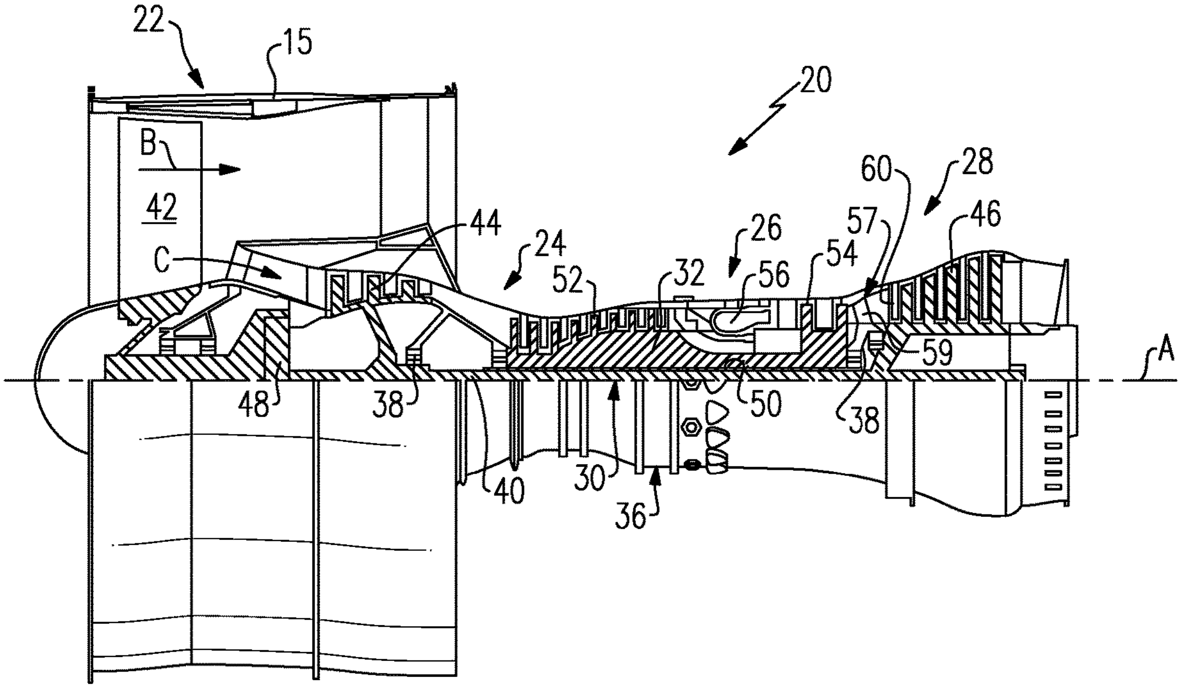
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(\text{Tram } ^\circ\text{R})/(518.7^\circ\text{R})]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
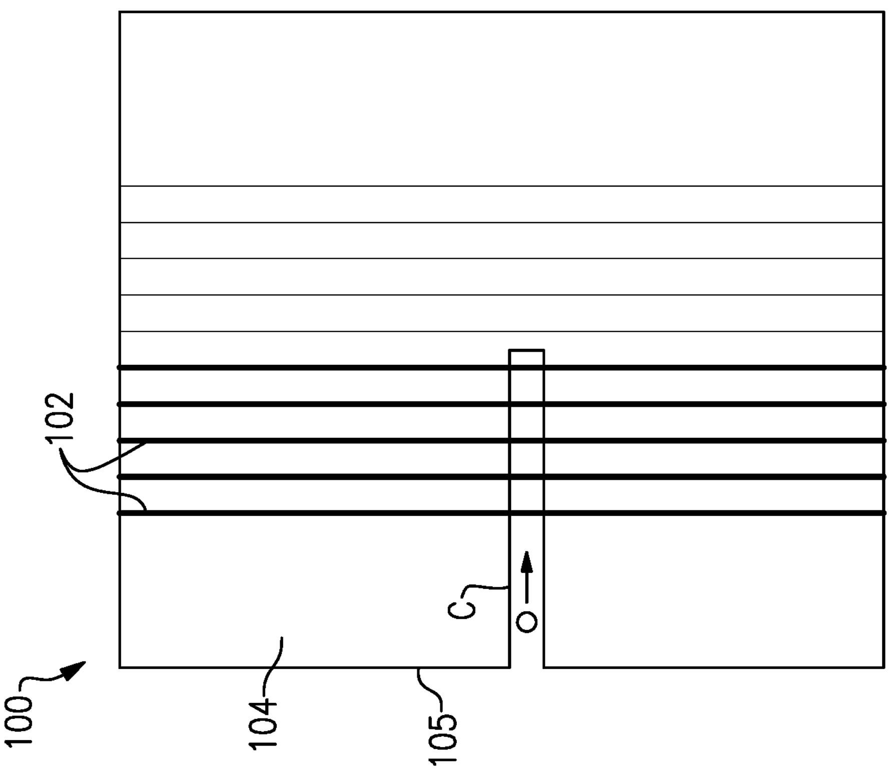
FIG.2 Prior Art
FIG. 2 schematically illustrates a prior art ceramic matrix composite article.

FIG. 2 schematically illustrates a prior art ceramic matrix composite ("CMC") article 100. The article 100 includes ceramic-based reinforcements 102 disposed in a ceramic-based matrix 104. Over its lifetime, the article 100 may be exposed to mechanical, temperature, and/or environmental stresses that can cause the matrix 104 to crack. An example crack C is shown in FIG. 2. The crack C will typically originate from a surface 105 of the article 100, providing a pathway for oxidant O ingress into the body of the article 100, which could lead to degradation of the matrix 104. Moreover, the crack C may expose certain of the reinforcements 102, leaving the reinforcements 102 susceptible to environmental attack by the oxidants O.

Figure 3:
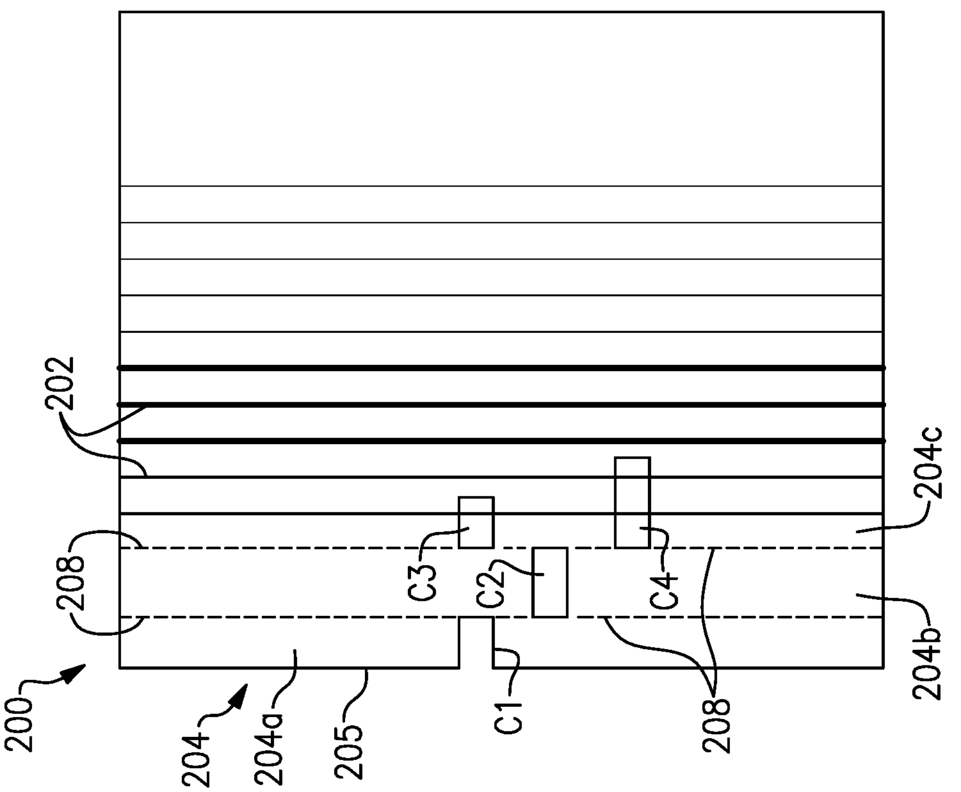
FIG. 3 schematically illustrates a crack-deflecting ceramic matrix composite article.
Figure 4:
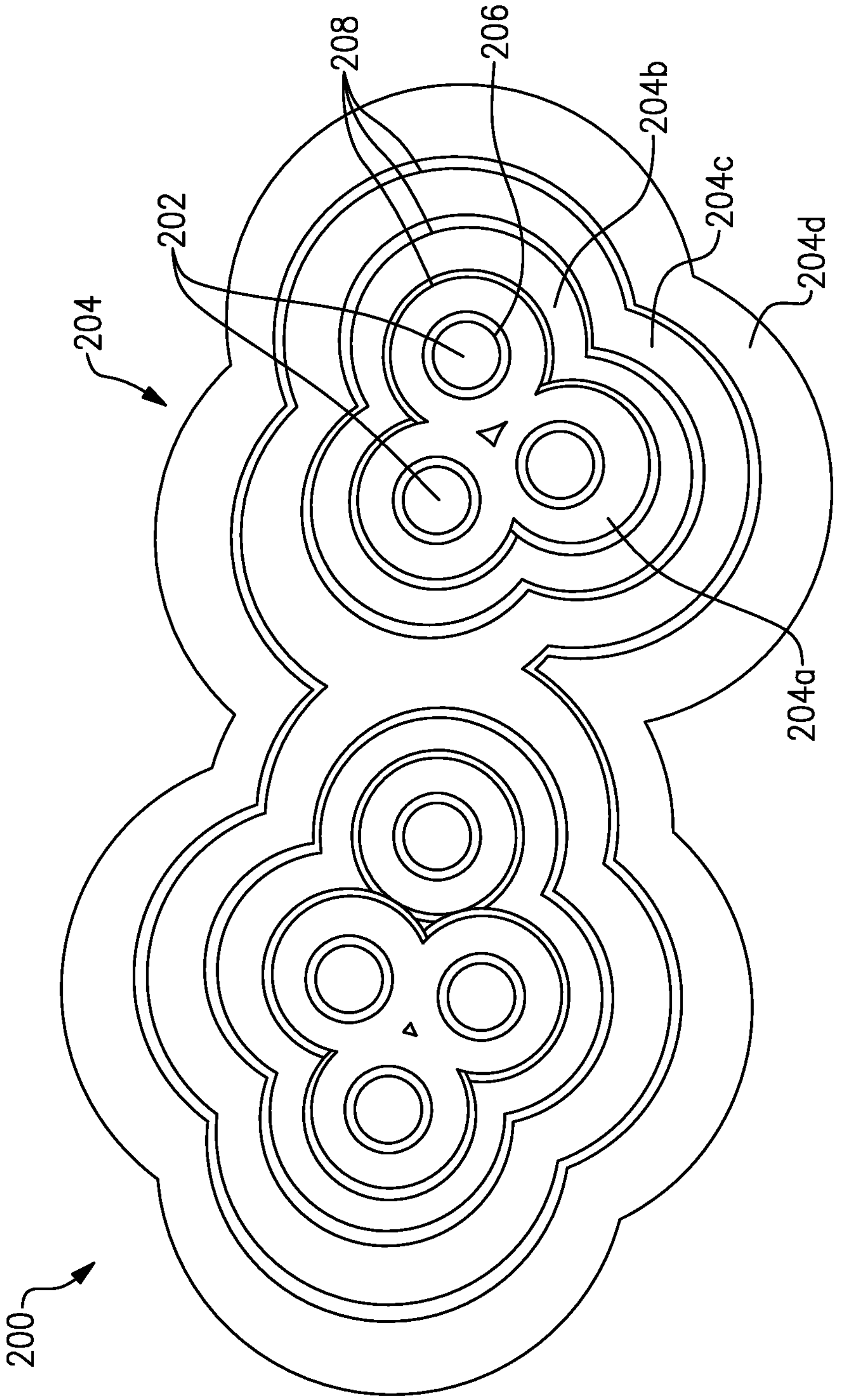
FIG. 4 illustrates a detail view of the ceramic matrix composite article of FIG. 3.

FIGS. 3 and 4 show a crack-deflecting CMC article 200. The article 200 can be, for example, an airfoil in the compressor section 24 or turbine section 28, a combustor liner panel in the combustor section 26, a blade outer air seal, or other component that would benefit from the examples herein. The article 200 includes ceramic-based reinforcements 202 disposed in a ceramic-based matrix 204. In this example, the ceramic-based reinforcements 202 are fibers, but it should be understood that other reinforcements like particles, platelets, etc. are also contemplated. In a particular example, both the ceramic-based matrix 204 and the fibers 202 are silicon carbide, but other materials are also contemplated. The fibers 202 can be arranged within the matrix 204 in a variety of ways which are well-known in the art. For instance, the fibers 202 can be woven or braided, or can be arranged unidirectionally, multidirectionally, or randomly.

The fibers 202 may include an interface coating 206 (FIG. 4). The interface coating 206 promotes load transfer between the fibers 202 and the matrix 204, and may in some examples provide environmental protection to the fibers 202. The interface coating 206 can be, for example, boron nitride. In general the interface coating 206 is a different material than the matrix 204. Other interface coatings 206 are known in the art. Even where the interface coating 206 provides a measure of environmental protection to the fibers 202, however, the protection may be limited in lifespan because the protective mechanism may include consumption of the interface coating 206.

As shown in FIG. 4, the fibers 202 are surrounded by a layer **204*a* of matrix. A secondary interface coating 208 is disposed on the matrix layer 204*a*. The secondary interface coating 208 may be boron nitride like the interface coating 206, but in other examples, can be a different material such as a thermally grown oxide, and in a more particular example a thermally grown oxide that is silica-based. The article 200 may include multiple alternating layers of secondary interface coating 208 and matrix 204. For instance, in the example of FIG. 4, there are four layers of matrix 204***a*/204*b*/204*c*/204*d*, each separated by a layer of secondary interface coating 208. In other examples, there may be up to 10 layers of matrix 204. The outermost layer of the article 200 is a layer of matrix 204.

In a particular example, the interface coating 206 is between about 50 and about 250 nanometers thick. Each of the inner matrix layers 204*a*/204*b*/204*c* are between about 5 and about 25 microns thick. The outermost matrix layer 204*d* may be thicker than the inner matrix layers 204*a*/204*b*/204*c*, and may be between about 25 and about 50 microns thick. The total matrix 204 thickness, e.g., the sum thickness of each of the matrix layers 204*a*/204*b*/204*c*/204*d*, is between about 25 and about 150 microns thick. Each layer of the secondary interface coating 208 is between about 50 and about 250 nanometers thick.

With continued reference to FIG. 3, a crack C1 may develop in the matrix 204, originating from a surface 205 of the article 200. However, once the crack C1 reaches a secondary interface coating 208 layer, the crack C1 is discouraged from propagating beyond the secondary interface coating 208. Stresses in the article 200 may cause other cracks such as cracks C2, C3, and C4 to form throughout the matrix 204. However, the cracks C2/C3/C4 are not aligned with one another, e.g., they tend to form in independent planes. Moreover, each crack C2/C3/C4 is discouraged from propagating when it reaches a secondary interface coating 208 because of the discontinuity between the matrix layer 204*a*/204*b*/204*c*/204*d* and the secondary interface coating 208, e.g., because the matrix layer 204*a*/204*b*/204*c*/204*d* is a distinct layer from the secondary interface coating 208. Even to the extent any of the cracks, such as crack C4, spans across fibers 202, the size of each crack C2/C3/C4 is minimized and none of the cracks C2/C3/C4 are exposed to the surface 205 of the article 200. Therefore the cracks C2/C3/C4 do not allow ingress of oxidants into the matrix 204.

With the secondary interface coating 208 provided between matrix layers 204*a*/204*b*/204*c*/204*d*, the only crack C1 which is exposed to the surface 205 of the article 200 is smaller than the crack C discussed above and shown in FIG. 2. Accordingly, much of the article 200 is protected from oxidant attack as compared to the article 100 discussed above. Moreover, the smaller size of the crack C1 is a minimal debit to the mechanical integrity of the article 200 as compared to the crack C in article 100 as discussed above.

Figure 5:
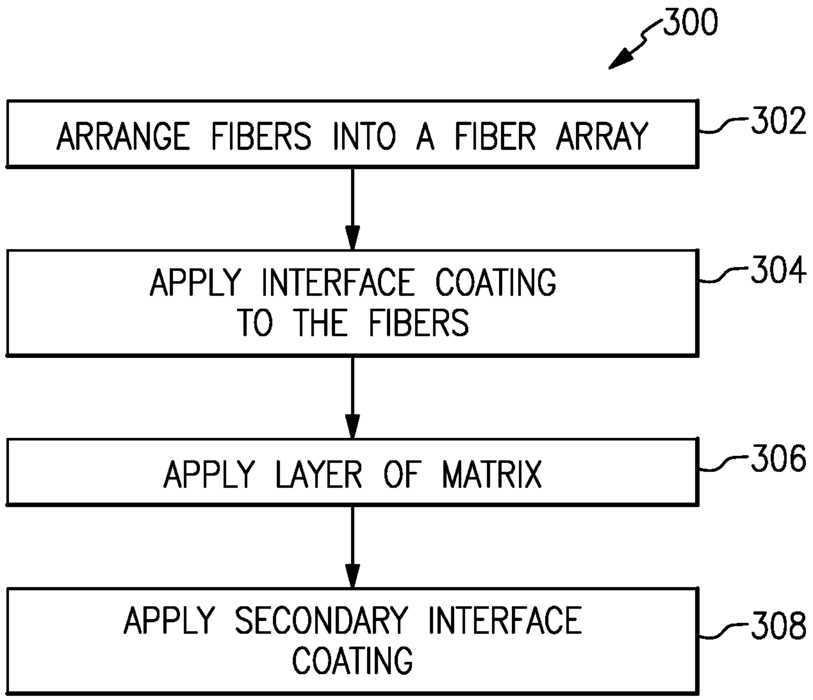
FIG. 5 schematically illustrates a method of making a crack-defleting ceramic matrix composite article.

FIG. 5 shows a method 300 of making a crack-deflecting ceramic matrix composite article 200. In step 302, fibers 202 are arranged or "layed up" in a desired configuration to form a fiber array. In step 304, the interface coating 206 is applied to the fibers 202 by any known method, such as chemical vapor infiltration (CVI). In step 306, a layer 204*a* of matrix is applied to the fibers 202 by any known method, such as CVI. In step 308, the secondary interface coating 208 is applied over the matrix layer 204*a* by any known method, such as CVI. Where CVI is used for steps 306 and 308, the process is interrupted after step 306 to provide a differentiation between the secondary interface coating 208 and the matrix layer 204*a*, that is, to provide a secondary interface coating 208 that is separate and distinct from the matrix layer 204*a*. Steps 306 and 308 may be repeated to form the desired number of matrix 204/secondary interface coating 208 layers. However, the final step is the deposition of matrix in step 306 such that the outermost layer is matrix 204.

The fiber array may be optionally rigidized between any of the steps 302/304/306. Rigidization is well-known in the art. After step 308, the article 200 may be subjected to post-processing steps such as machining and/or the application of coatings, which are well known in the art.

As used herein, the term "about" has the typical meaning in the art, however in a particular example "about" can mean deviations of up to 10% of the values described herein.

Although the different examples are illustrated as having specific components, the examples of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A ceramic matrix composite component, comprising:
- a plurality of ceramic-based reinforcements;
- an interface coating disposed on the ceramic-based reinforcements;
- a first layer of silicon carbide matrix disposed on the interface coating, wherein a thickness of the first layer of silicon carbide matrix is between about 5 and about 25 microns;
- a secondary interface coating disposed on the first layer of silicon carbide matrix, and the interface coating and the secondary interface coating are boron nitride; and
- a second layer of silicon carbide matrix disposed on the secondary interface coating, wherein the secondary interface coating is separate and distinct from the first and second layers of silicon carbide matrix, wherein a thickness of the second layer of silicon carbide matrix is between about 25 and about 50 microns thick.

2. The component of claim 1, wherein a thickness of the interface coating is between 50 and 250 nanometers.

3. The component of claim 1, wherein a thickness of the secondary interface coating is between 50 and 250 nanometers.

4. The component of claim 1, wherein a sum total thickness of the first and second layers of silicon carbide matrix is between about 25 and about 150 microns.

5. The component of claim 1, wherein the plurality of ceramic-based reinforcements are fibers.

6. The component of claim 1, further comprising an outermost layer of silicon carbide matrix disposed on the secondary interface coating, the interface coating has an interface coating thickness, the first layer has a first layer thickness, the second layer has a second layer thickness, the outermost layer has an outermost layer thickness, the first layer thickness is less than the interface coating thickness, the second layer thickness is less than the interface coating thickness, and the outermost layer thickness is greater than first layer thickness.

7. The component of claim 1, wherein the plurality of ceramic-based reinforcements are silicon carbide fibers.

8. The component of claim 1, wherein the interface coating is in direct contact with the ceramic-based reinforcements.

* * * * *